US012494106B2

(12) United States Patent
Acres

(10) Patent No.: US 12,494,106 B2
(45) Date of Patent: Dec. 9, 2025

(54) ELECTRO-MECHANICAL CHIP INDICATOR

(71) Applicant: Acres Technology, Las Vegas, NV (US)

(72) Inventor: John F. Acres, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 219 days.

(21) Appl. No.: 18/300,832

(22) Filed: Apr. 14, 2023

(65) Prior Publication Data

US 2023/0334938 A1 Oct. 19, 2023

Related U.S. Application Data

(60) Provisional application No. 63/331,041, filed on Apr. 14, 2022.

(51) Int. Cl.
*G07F 17/34* (2006.01)
*G06Q 50/34* (2012.01)
*G07F 17/32* (2006.01)

(52) U.S. Cl.
CPC ........... *G07F 17/322* (2013.01); *G06Q 50/34* (2013.01); *G07F 17/3237* (2013.01); *G07F 17/3244* (2013.01)

(58) Field of Classification Search
CPC . G07F 17/322; G07F 17/3251; G07F 17/3202
See application file for complete search history.

(56) References Cited

U.S. PATENT DOCUMENTS

| | | | | |
|---|---|---|---|---|
| 5,299,803 | A * | 4/1994 | Halaby | A63F 3/00157 273/148 R |
| 8,157,643 | B1 * | 4/2012 | Phan | G01G 19/42 273/148 R |
| 2005/0026680 | A1 * | 2/2005 | Gururajan | G07F 17/32 463/25 |
| 2006/0205485 | A1 | 9/2006 | Walker et al. | |
| 2006/0240890 | A1 | 10/2006 | Walker et al. | |
| 2007/0060264 | A1 * | 3/2007 | Okada | G07F 17/32 463/16 |
| 2007/0202942 | A1 * | 8/2007 | Oomori | G07F 17/32 463/25 |
| 2008/0039190 | A1 | 2/2008 | Walker et al. | |
| 2008/0153597 | A1 * | 6/2008 | Oliveras | G07F 17/32 463/42 |
| 2008/0290597 | A1 * | 11/2008 | Gentile | A63F 1/04 273/161 |
| 2010/0124967 | A1 | 5/2010 | Lutnick et al. | |
| 2014/0200071 | A1 * | 7/2014 | Czyzewski | G07F 17/3288 463/25 |
| 2015/0161848 | A1 | 6/2015 | Walker et al. | |
| 2018/0025581 | A1 * | 1/2018 | Marmarchi | G07F 17/3262 463/13 |

* cited by examiner

*Primary Examiner* — Steve Rowland
(74) *Attorney, Agent, or Firm* — Ballard Spahr LLP

(57) ABSTRACT

A credit balance and award tracking and display system is disclosed. One or more physical indicators configured to indicate one or more monetary values may be associated with one or more player positions at a table game. As wagers are placed, game play advanced, and outcomes and awards are determined, the physical indicators may be manipulated to reflect one or more credit balances and/or awards associated with the one or more player positions at the table game.

20 Claims, 8 Drawing Sheets

ELECTRO-MECHANICAL CHIP INDICATOR

CROSS-REFERENCE TO RELATED APPLICATION

This application is a continuation of, and claims the priority benefit of U.S. Provisional Application No. 63/331,041, filed Apr. 14, 2022, the entirety of which is incorporated herein by reference.

FIELD OF THE TECHNOLOGY

This disclosure relates generally to wagering games and methods and systems of displaying, via a gaming-token simulator, one or more credit balances and/or one or more awards associated with one or more players participating in the wagering game.

BACKGROUND

Casinos use a variety of methods to track and display credit balances and/or awards associated with game play. For example, slot machines may display a virtual credit meter but table games such as black-jack, roulette, or craps, typically track player credit balances and awards with physical chips. Some casinos have replaced physical chips at table games with virtual credit meters similar to those implemented on slot machines. However, many players do not like the virtual credit meters because the players and observers cannot see a "stack" of chips. This has several drawbacks. Many players consider the physical chips, which may include ornate designs and color patterns, to be visually appealing. Additionally, many players like to attract attention because crowds may make the gambling experience more exhilarating and large stacks of physical chips help attract attention.

SUMMARY

It is to be understood that both the following general description and the following detailed description are exemplary and explanatory only and are not restrictive. Methods and systems for managing operational commands are described.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
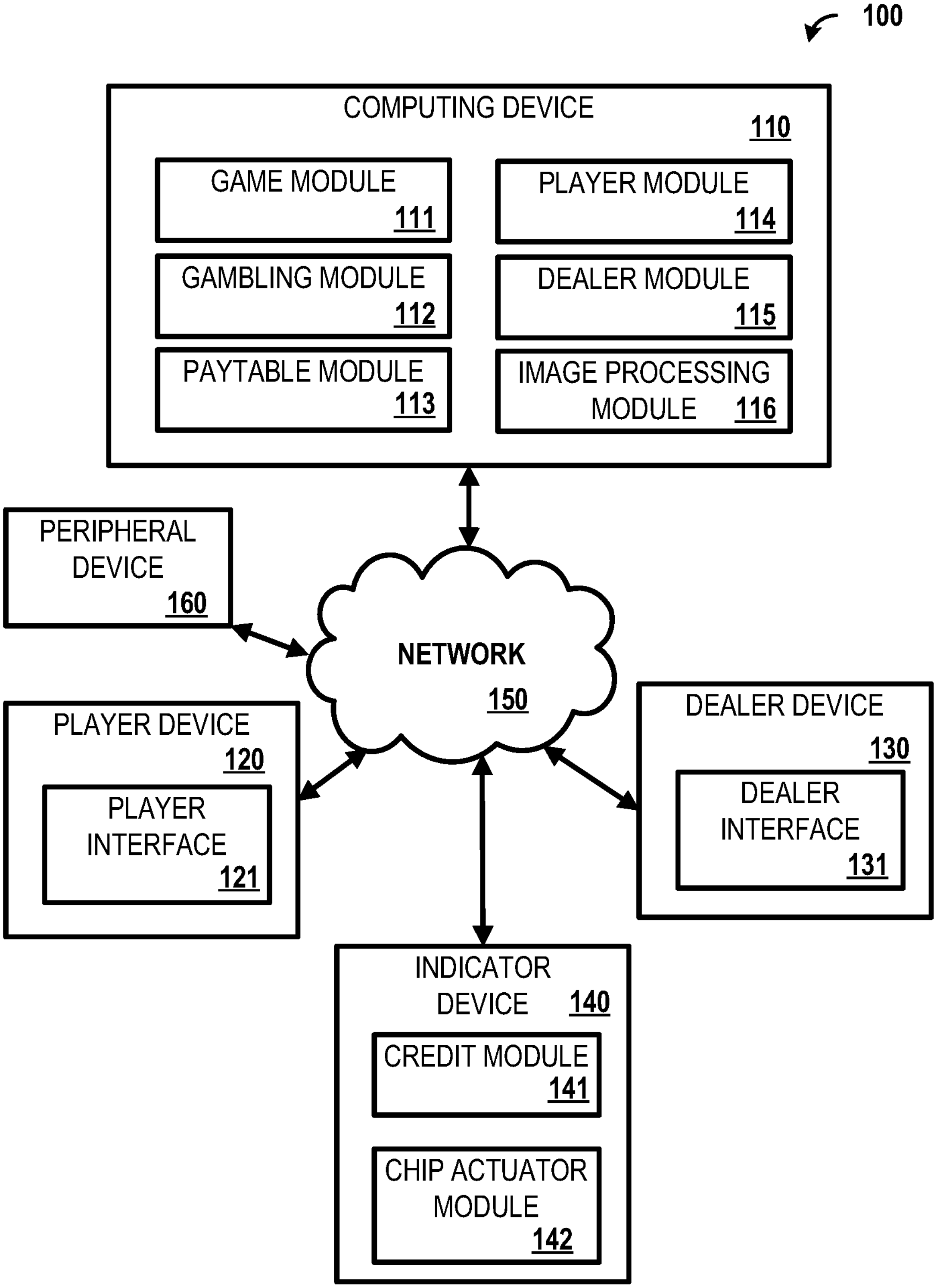
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

FIG. 1 shows an example system 100. The system 100 may comprise a computing device 110, one or more player devices 120, one or more dealer devices 130, one or more indicator devices 140, one or more networks 150, and one or more peripheral devices 160. The various devices may be in communication with any one or more of the other devices via a network 150. The network 150 may comprise any telecommunications network such as the Internet or a local area network. Other forms of communications can be used such as wired or wireless telecommunication channels, for example. The network 150 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. The communication protocols may be universal, generally applicable protocols or they may be game provider specific.

The computing device 110 may be configured to send, receive, generate, store, analyze, or otherwise process data to and/or from any one or more of the devices of FIG. 1. For example, the computing device 110 may send and receive data to and from the one or more player devices 120, the one or more indicator devices 140, and/or the dealer device 130. The computing device 110 may comprise a game server. The computing device 110 may comprise a game module 111, a gambling module 112, a paytable module 113, a player module 114, a dealer module 115, and an image capture module 116.

The game module 111 may be configured to facilitate playing one or more games. The one or more games may comprise any one or more games including casino table games like blackjack, poker, craps, roulette, or any other similar table game. The one or more games may comprise non-table games such as slots or non-table versions (e.g., virtual versions) of a table game (e.g., virtual poker, virtual blackjack, etc.). The game module may be configured to store one or more rules associated with the one or more games. The one or more rules may dictate player actions and/or dealer actions configured to carry out game play such as an order of turns of players, rules regarding the exchanging of credits, game pieces, cards, or the like, rules dictating a length of game play, a number of turns, or any other rules associated with any of the one or more games.

The gambling module 112 may be configured to facilitate gambling by tracking one or more amounts wagered by one or more players, credits associated with one or more players, awards won and/or lost by the one or more players and/or the "house" (e.g., the casino, the dealer, etc. . . . ) and other similar information. For example, the gambling module 112 may receive a wager amount from the one or more player devices.

The player module 114 may be configured to send, receive, store, generate, analyze, or otherwise process player data. For example, player module 114 and/or the player device 120 may include an identification device or module configured to receive a player-tracking device. The identification device may be configured to identify a player, by, for example, reading the player-tracking device, such as a player tracking card that is issued by the casino to individual players who choose to have such a card. The identification device may instead, or additionally, identify players through other methods. Briefly summarizing such a system, a player registers with the casino prior to commencing gaming. The casino issues a unique player-tracking card to the player and opens a corresponding player account that is stored on a server or host computer. The player account may include the player's name and mailing address and other information of interest to the casino in connection with marketing efforts. Prior to playing one of the gaming devices in the casino, the player inserts the player tracking card into the identification device thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may access their player tracking account, such as to check a total number of points, redeem points for various services, make changes to their account, or download promotional credits to the one or more player devices 120. In other embodiments, the identification device may read other identifying cards (such as driver licenses, credit cards, etc.) to identify a player and match them to a corresponding player tracking account. Other embodiments may include a player tracking unit with a biometric scanner, PIN code acceptor, or other methods of identifying a player to pair the player with their player tracking account.

The dealer module 115 may be configured to aid a dealer or other personnel in carrying out any of the one or more games. The dealer module may comprise an interface configured to receive one or more dealer inputs. For example, the one or more dealer inputs may comprise a credit loss, an award, or any other action taken by a dealer or other personnel. The dealer module 115 may interface with one or more other devise in the system 100. For example, in the case the peripheral device 160 comprises a camera or other device configured to capture image data, the dealer module 150 may be configured to determine wagers, cards dealt, die rolled, winning numbers, winning pockets (e.g., in a roulette wheel), baccarat results, pai gow tiles, sic bo dice results, combinations thereof, and the like.

The image processing module 116 may be configured to send and receive image data and the like to and from, for example, any one or more of the player device 120, the dealer device 130, and/or the peripheral device 160. For example, the peripheral device 160 may be a camera or other image capture device configured to monitor a field of view and capture one or more images (and/or video) therein. The peripheral device may configured to object detection and recognition capabilities, semantic labeling capabilities, facial recognition and detection capabilities, combinations thereof, and the like. For example, the peripheral device 160 may be configured to detect and determine one or more playing cards, one or more roulette squares and/or wheels, craps table images, combinations thereof, and the like. The peripheral device 160 may be configured to recognize faces such as preferred players, loyalty program members, or prohibited players (e.g., known gambling addicts, criminals, persons of interest etc. . . . ).

The one or more player devices 120 may be configured to send, receive, store, generate, analyze, or otherwise process data. The one or more player devices 120 may comprise computer-based gaming machines, table games, wireless gaming devices, multi-player gaming stations, modified personal electronic gaming devices (such as cell phones), personal computers, server-based gaming terminals, and other similar devices. The one or more player devices may include one or more player interfaces 121. The one or more player interfaces may be configured to receive one or more inputs. The one or more player interfaces may comprise one or more displays (e.g., touch screens) or any other input and/or output mechanisms. For example, the one or more player interfaces may be configured to receive one or more wagers. For example, a player may interact with the one or more player interfaces to designate an amount of credits, chips, money, etc. that the player wishes to wager on the outcome of a game. The interface may include a credit meter and a coin-in or a bet meter. The credit meter may indicate the total number of credits remaining that are eligible to be wagered. In some embodiments, the credit meter may reflect a monetary unit, such as dollars. However, it is often preferable to have the credit meter reflect a number of "credits," rather than a monetary unit. The bet meter may indicate the amount of credits to be wagered on a particular game or turn. Thus, for each game, the player transfers the amount that he or she wants to wager from the credit meter to the bet meter. In some embodiments, various other meters may be present, such as meters reflecting amounts won, amounts paid, or the like.

The one or more indicator devices 140 may be configured to send, receive, store, generate, analyze, or otherwise process data. For example, the player device 120 may send credit data, wager data, and/or payout data to the one or more indicator devices 140. Similarly, the computing device 110 and/or the dealer device 130 may send credit data, wager data, jackpot data, bonus data, paytable table, any other data, combinations thereof, and the like.

For example, during typical play, a player may initiate a game by placing a wager and then participating in a game. For example, the player may initially insert monetary bills or tickets with a credit value into a bill acceptor and/or exchange the monetary bills or tickets with a dealer for credits to be used in the game. Similarly, the player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this technology is useful with all gambling devices, regardless of the manner in which wager value-input is accomplished.

The indicator device 140 may comprise a credit meter configured to display a value of the monetary bills or credits available for user during the game (e.g., chips). For example, a player may insert a twenty dollar bill into the bill acceptor or hand the twenty dollar bill to a dealer. The bill acceptor and/or the dealer may determine the value of the twenty dollar bill and cause the indicator device to reflect the value.

As described in greater deal with respect to FIG. 2 below, the one or more indicator devices 140 may comprise one or more chip indicators (e.g., physical representation(s) of one or more credit balances, gaming token simulator) configured to physically represent the value of credits available for play during the game and/or changes therein due to, for example, wins, losses, and/or deposits by the player. The indicator device 140 may be configured to cause the one or more chip indicators to move (e.g., up and/or down) to reflect changes in the credits available for play during the game. For example, the player may place a wager of $10 and, if lost, a chip indicator of the one or more chip indicators may move down one or more increments corresponding to the value of the lost wager. Similarly, if the game play is successful and the wager is won, the chip indicator of the one or more chip indicators may move up one or more increments corresponding to the value of the won wager. The one or more chip indicators may be configured to reflect any value of credits/dollars/and the like in any denomination or unit.

A chip indicator device or apparatus may comprise one or more processors and memory storing processor executable instructions. The processor executable instructions may be configured to cause the chip indicator device or apparatus to: receive one or more credit balances associated with one or more players, cause output, based on the one or more credit balances associated with the one or more players, via one or more chip indicators, one or more physical representations of the one or more credit balances, receive one or more commands configured to cause the chip indicator apparatus to reconfigure the one or more chip indicators, and cause output, based on the one or more commands, via the one or more chip indicators, one or more physical representations of one or more updated credit balances. The one or more chip indicators comprise one or more physical objects configured to represent a quantity of casino chips. The chip indicator apparatus may be integral to one or more gaming tables or may be a mobile device configured to be moved from place to place (e.g., table to table). The processor executable instructions that, when executed by the one or more processors, cause the chip indicator apparatus to determine the one or more credit balances associated with the one or more players may further cause the chip indicator apparatus to one or more of: receive one or more user inputs, receive one or more player identifier cards, query a database configured to store one or more player accounts associated with the one or more players, or receive one or more signals from one or more mobile devices associated with the one or more players. The processor executable instructions that, when executed by the one or more processors, cause the chip indicator apparatus to cause the one or more chip indicators to be configured as the one or more physical representations of the one or more credit balances may further cause the chip indicator apparatus to cause an actuation of one or more electro-mechanical motors coupled to the one or more chip indicators such that the one or more chip indicators may be configured (e.g., reconfigured) to physically represent the value of one or more wagers, one or more credit balances, amounts won or lost, amounts available for play, combinations thereof, and the like.

The player interface 121 may include one or more game buttons that can be actuated by the player to cause the player device to perform a specific action. For example, one or more of the buttons may cause the player device to bet one or more credits to be wagered during the game or cash out the credits remaining (as indicated on the credit meter). In addition, the interface may include one or more game actuating buttons. The interface may include a "Max Bet" button that places the maximum credit wager on a game. The player device 120 may further include a bill acceptor and a ticket printer. The bill acceptor may accept and validate paper money or previously printed tickets with a credit balance. The ticket printer may print out tickets reflecting the balance of the credits that remain on the gaming device when a player cashes out by pressing one of the game buttons programmed to cause a "cashout." These tickets may be inserted into other gaming machines or redeemed at a cashier station or kiosk for cash. The player device 120 may also include one or more speakers configured to output auditory information or sounds (e.g., to be heard by the player). The auditory information may include specific sounds associated with particular events that occur during game play on the gaming device. For example, a particularly festive sound may be played during a large win or when a bonus is triggered.

The interface may include a display. The display may be a vacuum fluorescent display (VFD), a liquid crystal display (LCD), light emitting diode (LED/OLED), a cathode ray tube (CRT), a plasma screen, or the like. The display may show any combination of primary game information and ancillary information to the player. For example, the display may show player tracking information, bonus information, advertisements, or player selectable game options.

The gaming device (e.g., computing device 110) may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window." Another example is Las Vegas Gaming Incorporated's retrofit technology which allows information to be placed over areas of the game or the secondary display screen at various times and in various situations.

The gaming device may include a microprocessor that controls operation of the gaming device. If the gaming device is a standalone gaming device, the microprocessor may control virtually all of the operations of the gaming device and any attached equipment, such as operating game logic stored in memory (not shown) as firmware, controlling the display to represent the outcome of a game, communicating with the other peripheral devices (such as the peripheral device 160, a player tracking card acceptor, a bill acceptor, similar devices, combinations thereof, and the like), and orchestrating the lighting and sound emanating from the gaming device. In some embodiments where the gaming device is coupled to the network 150, as described herein, the microprocessor may have different tasks depending on the setup and function of the gaming device. For example, the microprocessor may be responsible for running the base game of the gaming device and executing instructions received over the network 150 from a bonus server or player tracking server. In a server-based gaming setup, the microprocessor may act as a terminal to execute instructions from a remote server that is running game play on the gaming device.

The microprocessor may be coupled to a machine communication interface (MCI) that connects the gaming device to the network 150. The MCI may be coupled to the microprocessor through a serial connection, a parallel connection, an optical connection, or in some cases a wireless connection. The gaming device may include memory (MEM), such as a random access memory (RAM), coupled to the microprocessor and which can be used to store gaming information, such as storing total coin-in statistics about a present or past gaming session, which can be communicated to a remote server or database through the MCI. The MCI may also facilitate communication between the network 150 and the secondary display or a player tracking unit housed in the gaming cabinet.

Figure 2A:
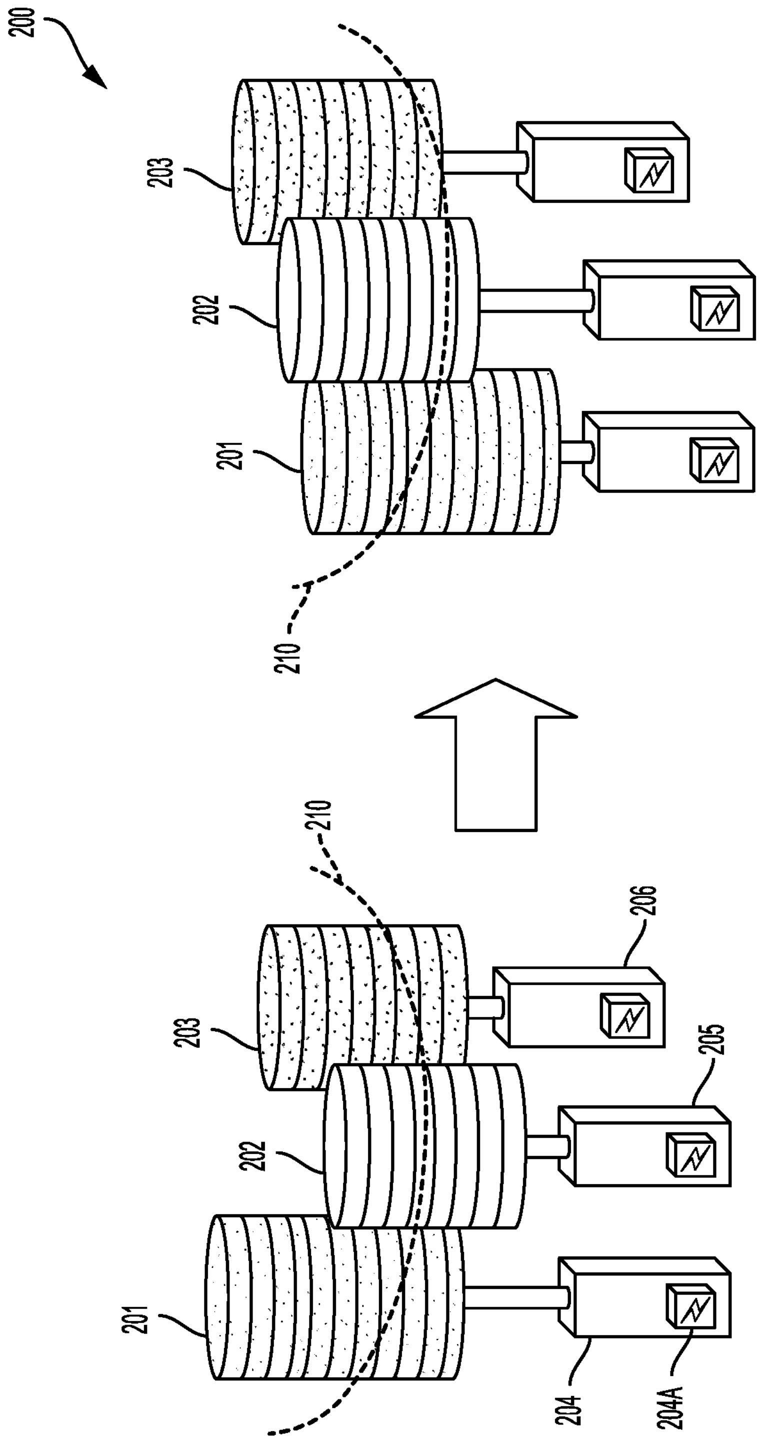
FIGS. 2A-2C show an example device and systems.
Figure 2B:
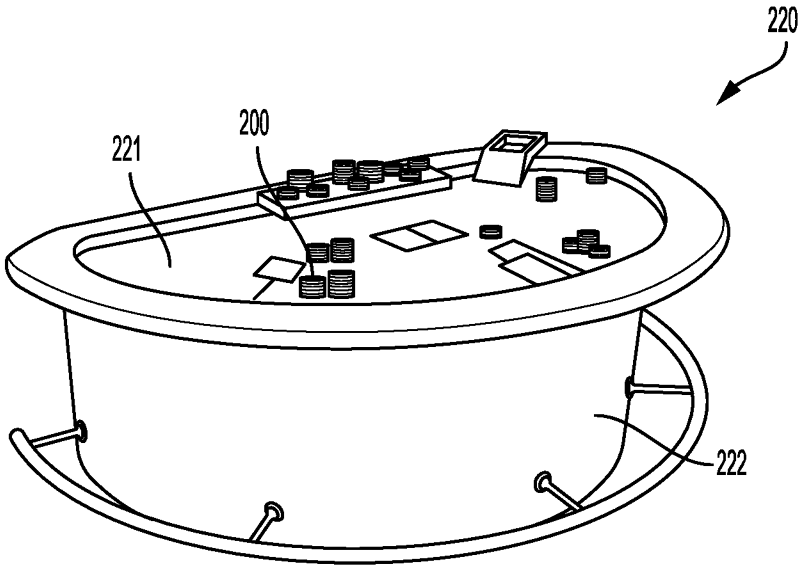
Figure 2C:
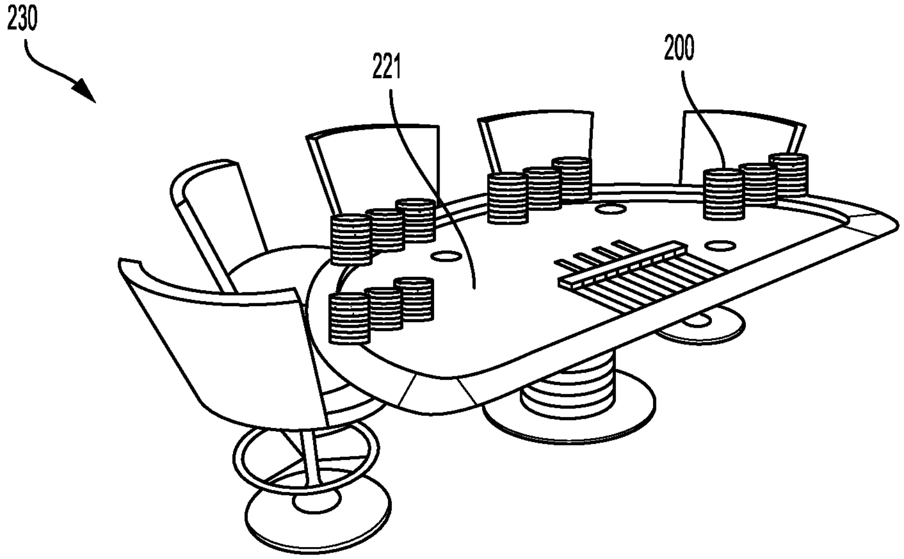

FIGS. 2A-2C show exemplary embodiments. For example, FIG. 2A shows operation of a chip indicator device 200 (e.g., the indicator device 140). The chip indicator device 200 may comprise a gaming token simulator. The gaming token simulator may comprise an electro-mechanical device configured to represent a number and/or value of gaming tokens (e.g., chips) associated with a wager, an award (e.g., a win), a loss, a player account, combinations thereof, and the like. The chip indicator device 200 may be configured to detect proximity of a player identifying object (e.g., a loyalty card, a mobile device associated with the player, a biometric, combinations thereof, and the like), and query a database configured to store player information. Based on the query, the chip indicator device (or another device in communication with the chip indicator device) may determine (e.g., based on a response to the query) an amount of credits to represented by the chip indicator device. For example, a player account may indicate an account balance of $150. Thus, the chip indicator device may, upon initiation, represent $150. The chip indicator may be mobile and may be configured to be mounted to a surface or the border of a surface (e.g., a border of a table). The chip indicator may be built into the table.

The chip indicator device may comprise one or more chip indicators 201-203. The one or more chip indicators 201-203 may resemble one or more casino chips (e.g., stacks of casino chips). For example, each chip indicator may comprise a cylinder marked by notches or coloring or some other marking configured to designate a number of chips (e.g., dollars, credits, etc.). Each chip indicator of the one or more chip indicators 201-203 may comprise a color wherein the respective color of each chip indicator corresponds to value or denomination of an underlying credit. For example, each of the chip indicators 201-203 may comprise 10 markers with chip indicator 201 being a first color associated with a first value (e.g., $1/chip), whereas chip indicator 202 may comprise a second color associated with second value (e.g., $10/chip), and chip indicator 203 may be a third color associated with a third value (e.g., $100/chip).

Each chip stack of the one or more chip stacks 201-203 may be communicatively coupled to a movement mechanism such as an actuator, motor, pump, or the like. For example, the chip indicator device 200 comprises three movement mechanisms 204-206. For example, the one or more movement mechanism may be configured to raise or lower the one or more chip indicators 201-203 with respect to (e.g., up or down with relation to or above or below) one or more surfaces 210. For example, the one or more surfaces 210 may comprise the surface of a table game such as blackjack, craps, roulette or some other surface nearby (e.g., in the case that it would be inappropriate to place chips on the playing surface, the chip indicator may be placed/mounted on another surface nearby).

The one or more movement mechanisms may receive one or more movement instructions via one or more communication links associated with the device and/or each respective movement mechanism (e.g., communication link 204A). For example, based on a player placing a wager of $10 and losing the wager, the chip indicator device may receive an instruction from another device and/or directly from a player or dealer via an interface (e.g., any device of system 100 via the network 150) to lower the chip indicator 202 (e.g., the $10 value chip indicator) by one increment. Conversely, but by way of similar principles, and for example, based on placing a wager of $100 and winning a game associated with 3:1 odds, the chip indicator device 200 may receive an instruction to move the third chip indicator 203 (e.g., the $100 chip indicator) up three increments.

The instruction to raise or lower a give chip indicator of the one or more chip indicators 201-203 may be received from, for example, the dealer device 130 based on a dealer input received the dealer interface 131. In other embodiments, the instruction may come from the computing 110 based on data received via any of the devices of system 100. For example, in an intelligent application, the peripheral device may be configured to, via object detection and recognition, automatically determine winning and losing outcomes and, based on amounts wagered and odds associated with various outcomes, send one or more instructions to the one or more chip indicator devices. Greater detail about this embodiment is given in the description of FIGS. 3A-3B below.

FIG. 2B shows an example table game table system 220 and FIG. 2C shows an example table game table system 230. In FIG. 2B, the one or more chip indicator devices 200 may be disposed in a table cabinet 222, below a table surface 221 such that the one or more chip indicators 201-203 may appear to rise from and lower into the table surface 221. In FIG. 2C, the one or more chip indicator devices 200 may be disposed on the table surface 221. In this embodiment, the one or more chip indicator devices 200 may not be affixed to or disposed within the table but may be mobile such that a player may carry the devices 200 from table to table. In this configuration, the one or more chip stack indicators may be configured like nesting pucks wherein each increment comprises a nested puck configured to raise and lower in increments (e.g., levels) corresponding to wagers won and lost.

The system may comprise a gaming table. The gaming table may comprise one or more player positions. The system may comprise a first (e.g., central) computing device configured to send, receive, store, or otherwise process gaming data (e.g., game play, wagers, credit balances, odds, paylines, paytables, combinations thereof, and the like). One or more chip indicator devices may be disposed at the one or more player positions. The one or more chip indicator devices may be integral to the gaming table or may be removable (e.g., movable, mobile) and configured to be moved from place to place. In the case that the one or more chip indicator devices are integral to the gaming table, they may be disposed anywhere in or on the gaming table. For example, the one or more chip indicator devices may be disposed within the table such that the one or more chip indicators rise and fall above or below the surface of the gaming table. The one or more chip indicator devices may be disposed on the surface of the gaming table.

The system may comprise one or more chip indicator devices associated with each player station of the one or more player stations, wherein each chip indicator device of the one or more chip indicator devices comprises one or more motors configured to configure one or more chip indicators as one or more physical representations of a credit value. The one or more chip indicator devices may be configured to receive one or more credit balances associated with one or more players at the one or more player stations. The one or more chip indicator devices may be configured to cause output, based on the one or more credit balances associated with the one or more players, via the one or more chip indicators, the one or more physical representations of the one or more credit balances. The one or more chip indicator devices may be configured to receive, based on game play, one or more commands configured to cause the one or more chip indicator devices to reconfigure the one or more chip indicators. The one or more chip indicator devices may be configured to cause output, based on the one or more commands, via the one or more chip indicators, one or more physical representations of one or more updated credit balances. The one or more chip indicators may comprise one or more physical objects configured to represent a quantity of casino chips. The one or more chip indicator devices may be integral to one or more gaming tables. The one or more chip indicator devices comprise one or more mobile chip indicator devices.

The central computing device and/or the one or more chip indicator devices may be configured to determine, send, or receive, the one or more credit balances associated with the one or more players by one or more of: receiving one or more user inputs, receiving one or more player identifier cards, querying a database configured to store one or more player accounts associated with the one or more players, or receiving one or more signals from one or more mobile devices associated with the one or more players. The computing device and/or the one or more chip indicator devices may be configured to cause output of the one or more physical representations of the one or more credit balances by causing one or more actuations of one or more electromechanical motors coupled to the one or more chip indicators. The computing device and/or the one or more chip indicator devices may be configured to send and/or receive one or more wagers.

Figure 3A:
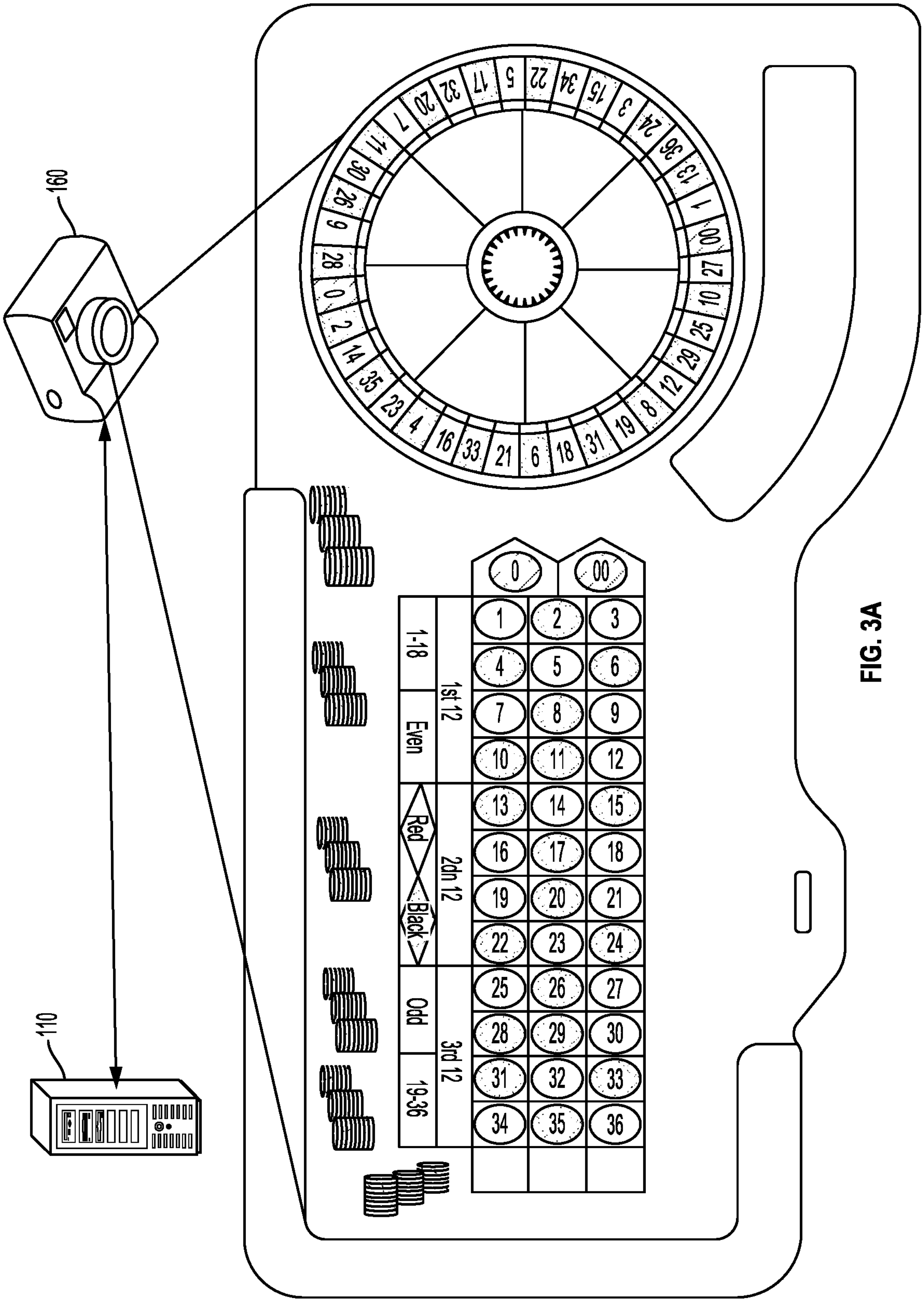
FIGS. 3A-3B show example systems.
Figure 3B:
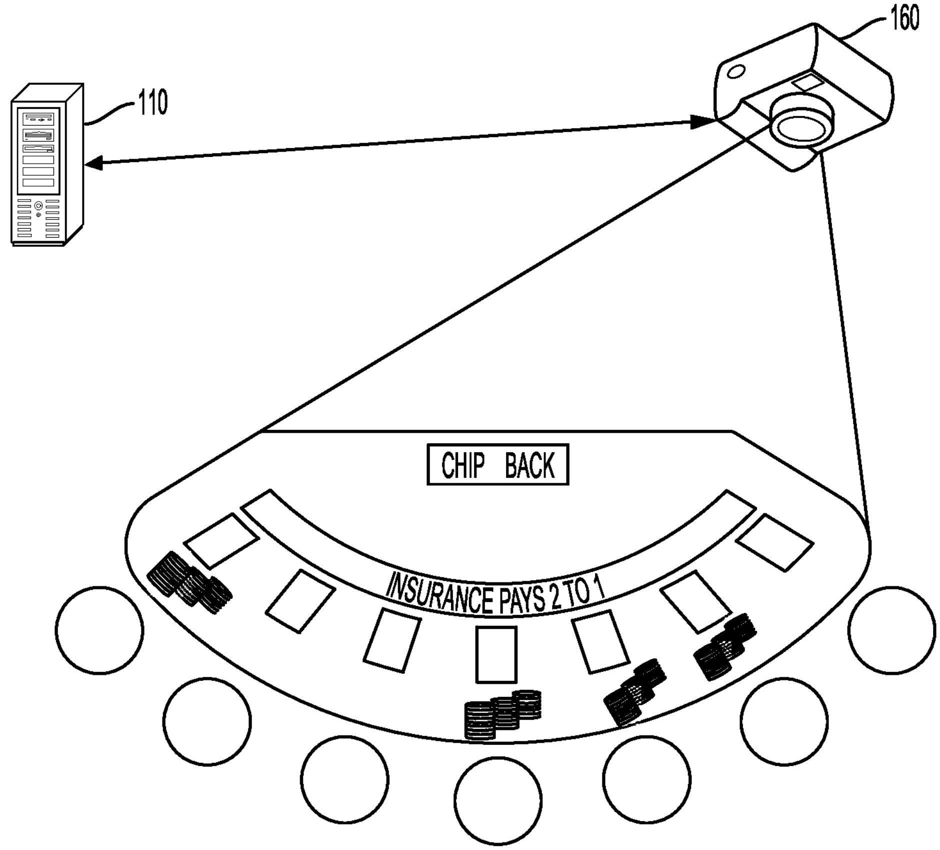

FIGS. 3A-3B show exemplary embodiments of the present disclosure wherein the one or more peripheral devices 160 comprise an image capture device. The image capture device may be in communication with the computing device 110. The image capture device may configured to capture game play data such as where a roulette ball lands, or the cards held by the dealer and players in a Texas Hold 'Em game. The aforementioned examples are merely exemplary and explanatory and in no way limiting and a person skilled in the art will appreciate the image capture device may be configured to capture and process any image data. Further, the system may comprise one or more image capture devices (e.g., one for the dealer, and one or more each player, as is seen on the World Poker Tour wherein players hands are captured by cameras, but not seen by other players). For example, the image capture device may be configured with object detection and recognition capabilities. For example, the image capture device may be configured to detect and recognize playing cards, chips, letters and numbers on tables and other objects (e.g., a roulette table, roulette wheel, and roulette ball). The image capture device may be configured to determine when a letter or number or other symbol is obscured (e.g., whether or not one or more wagers have been placed in any one or more zones on the roulette table and/or what cards have been dealt in a five-card hold 'em game or other similar games). The image capture device may send processed image data (e.g., labeled) to any of the devices of system 100, for example, the computing device 110. The computing device 110 may, based on the image data, determine game play results such as a successful wager in roulette or a losing hand in poker upon the laying down of cards.

Figure 4:
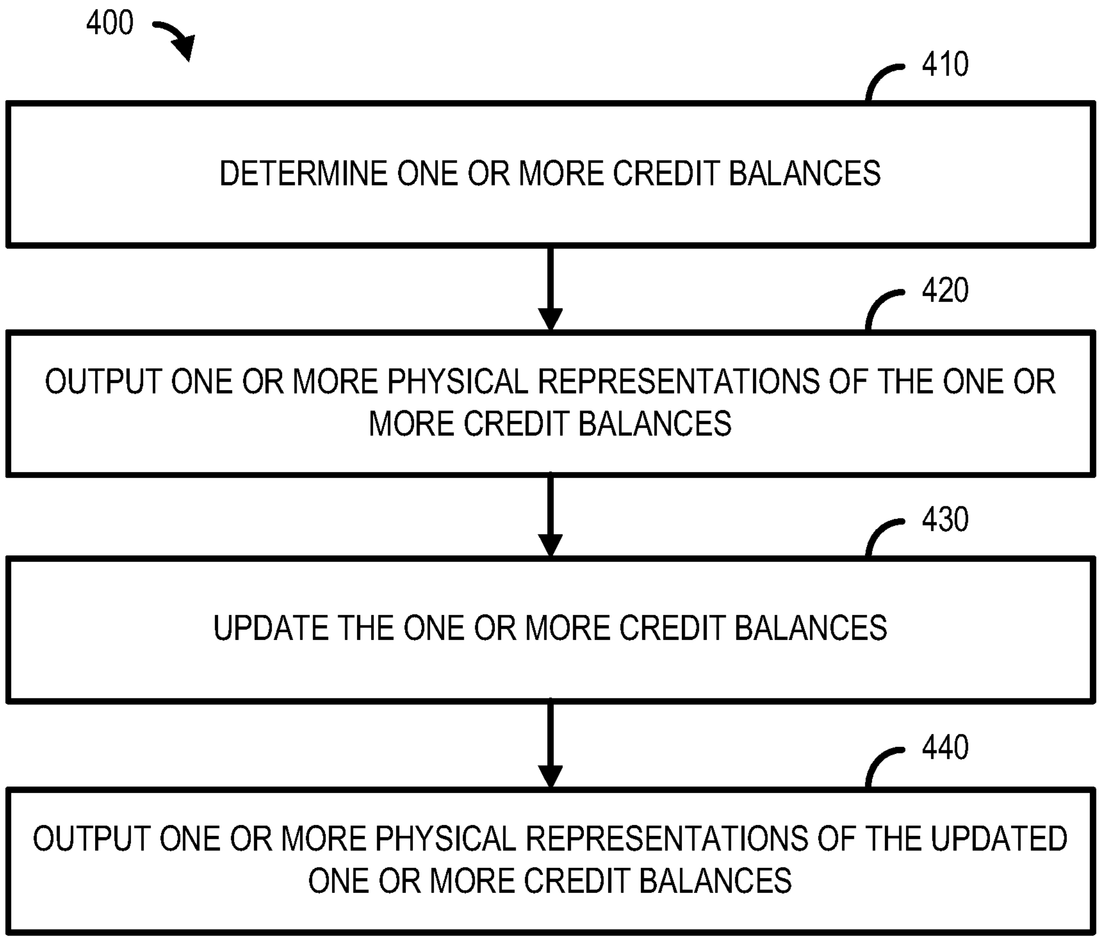
FIG. 4 shows an example method.

FIG. 4 shows an example method. At 410, one or more credit balances (e.g., and/or portions thereof) may be determined. The term one or more credit balances is to be understood to include one or more portions of one or more credit balances. For example, the one or more credit balances may be determined before initiating game play associated with a game or at any other time during game play such as after a player's turn or round of turns. The one or more credit balances may represent or otherwise be associated with a monetary value such as a quantity of dollars or other currency. The one or more credit balances may, however, be represented in any form including as credits or any denomination or any currency. The one or more credit balances may be associated with funds received via a bill acceptor, coin acceptor, electronic funds transfer, loyalty program points, saved credits, combinations thereof, and the like.

The one or more credit balances may be associated with one or more player accounts. For example, the one or more credit balances may be determined by querying a database configured to store one or more player profiles associated with one or more players. For example, one or more player identifiers may be determined. For example, the one or more player identifiers may be determined based on receipt of one or more player identifier cards (e.g., identification such as driver's license, passport, non-driver identification, loyalty cards associated with one or more casinos, loyalty cards associated with one or more gambling platforms, combinations thereof, and the like). The one or more player identifiers may be determined based on facial recognition. The one or more player identifiers may be determined based on proximity of, and/or communication with, one or more mobile devices associated with the one or more players. For example, a player may use a mobile phone to send a signal, scan a code (e.g., a QR code, a barcode), and thus the one or more player identifiers may be determined.

At 420, one or more chip indicators may be configured as one or more physical representations of the one or more credit balances. For example, one or more chip indicator devices may be associated with one or more player stations at a gaming table (e.g., blackjack, poker, poker, pai gow, roullete, slots, combinations thereof, and the like). For example, the one or more chip indicator devices may comprise the one or more chip indicators. The one or more chip indicator devices may comprise cylinders or other shapes configured to represent one or more quantities of casino chips. The one or more chip indicator devices may comprise one or more electro-mechanical motors coupled to the one or more chip indicators and configured to adjust a position (e.g., raise or lower) the one or more chip indicators. The one or more chip indicator devices may comprise one or more communication modules configured to send and receive data such as one or more commands configured to cause the one or more electro-mechanical motors to raise or lower the one or more chip indicators.

The one or more chip indicator devices may be integral to a player table, or may be mobile such that the one or more chip indicator devices may be carried from place to place (e.g., table to table) by the one or more players. The one or more chip indicators may comprise one or more shapes, one or more colors, one or more dimensions, or other features associated with one or more values. For example, each chip indicator device may comprise a plurality of chip indicators. For example, a first chip indicator may be configured to indicate values (e.g., dominations) of one credit, one dollar, or the like. For example, a second chip indicator of the plurality of chip indicators may be configured to indicate values (e.g., denominations) of five credits, five dollars, or the like. Similarly, a third chip indicator of the plurality of chip indicators may be configured to indicate ten dollar denominations, while a fourth chip indicator is configured to indicate one hundred dollar denominations. The aforementioned are merely exemplary and a person skilled in the art will appreciate that any denominations may be represented (e.g., indicated) by any number of chip indicators of a chip indicator device.

At 430, the one or more credit balances may be updated. For example, the one or more credit balances may be updated based on game play (e.g., by the one or more players placing one or more wagers, executing a game function, and determining the result of the one or more wagers). For example, the one or more outcomes of game play may comprise one or more wagers won, one or more wagers lost, or any other gaming action which may affect the one or more credit balances (e.g., the winning or losing of credits or money).

One or more signals may be generated. The one or more signals may be generated based on the game play. The one or more signals may comprise one or more commands. The one or more commands may be associated with the one or more adjusted credit balances. The one or more commands may be configured to cause the one or more chip indicator devices to adjust one or more heights, colors, positions, etc. . . . associated with the one or more chip indicators based on the game outcomes. For example, if a player places a $10 wager and loses, a first signal of the one or more signals may be sent to a first chip indicator device. The first signal sent to the first chip indicator device may be configured to cause the first chip indicator device to adjust the height of a $10 chip indicator by one increment. Similarly, based on placing a wager of $100 and winning a game associated with 3:1 odds, the chip indicator device may receive an instruction to move a second chip indicator (e.g., a $100 chip indicator) up three increments.

The one or more signals may be sent. For example, a computing device like a gaming server may send the one or more signals to the one or more chip indicator devices via a network such as the network 150. The one or more signals may comprise one or more increment amounts and associated one or more adjusted credit balances or other data. The one or more signals may be configured to cause the one or more chip indicator devices to manipulate the one or more chip indicators according to the one or more increment amounts.

At 440, the one or more chip indicators may be caused to be configured as one or more physical representations of the updated one or more credit balances. For example, the one or more chip indicators associated with the one or more chip indicator devices may be caused to be moved. For example, the one or more chip indicators associated with the one or more chip indicator devices may be caused to be moved based on the one or more signals (e.g., the one or more increment amounts based on the one or more adjusted credit balances). For example, the one or more chip indicators may be raised or lowered to represent the updated one or more credit balances.

Figure 5:
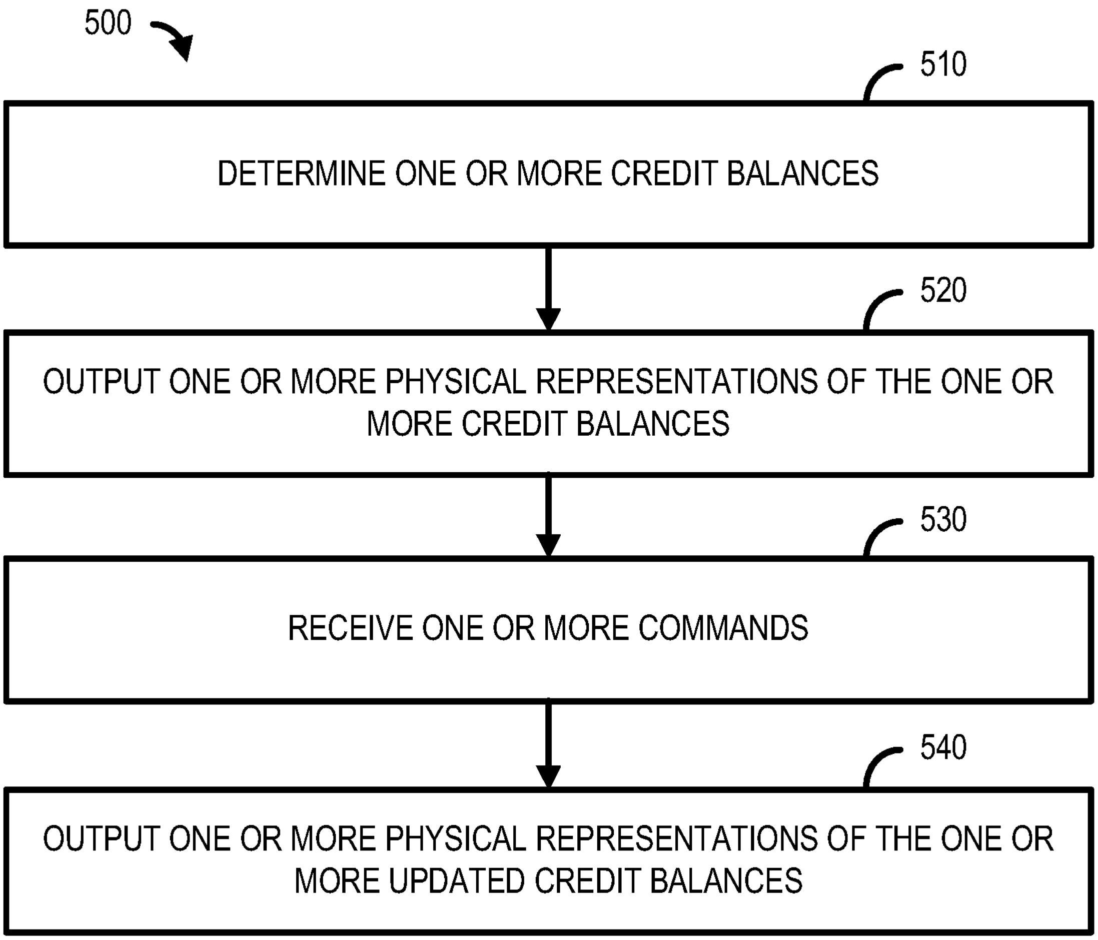
FIG. 5 shows an example method.

FIG. 5 shows an example method 500. At 510, one or more credit balances may be determined. The one or more credit balances may be determined by a chip indicator device. For example, the one or more credit balances may be determined before initiating game play associated with a game or at any other time during game play such as after a player's turn or round of turns. The one or more credit balances may represent or otherwise be associated with a monetary value such as a quantity of dollars or other currency. The one or more credit balances may, however, be represented in any form including as credits or any denomination or any currency. The one or more credit balances may be associated with funds received via a bill acceptor, coin acceptor, electronic funds transfer, loyalty program points, saved credits, combinations thereof, and the like.

The one or more credit balances may be associated with one or more player accounts. For example, the one or more credit balances may be determined by querying a database configured to store one or more player profiles associated with one or more players. For example, one or more player identifiers may be determined. For example, the one or more player identifiers may be determined based on receipt of one or more player identifier cards (e.g., identification such as driver's license, passport, non-driver identification, loyalty cards associated with one or more casinos, loyalty cards associated with one or more gambling platforms, combinations thereof, and the like). The one or more player identifiers may be determined based on facial recognition. The one or more player identifiers may be determined based on proximity of, and/or communication with, one or more mobile devices associated with the one or more players. For example, a player may use a mobile phone to send a signal, scan a code (e.g., a QR code, a barcode), and thus the one or more player identifiers may be determined.

At 520, one or more physical representations of the one or more credit balances may be output. The one or more physical representations of the one or more credit balances may be caused to be output based on the one or more credit balances associated with the player. The one or more chip indicators may be configured as one or more physical representations of the one or more credit balances. For example, one or more chip indicator devices may be associated with one or more player stations at a gaming table (e.g., blackjack, poker, poker, pai gow, roullete, slots, combinations thereof, and the like). For example, the one or more chip indicator devices may comprise the one or more chip indicators. The one or more chip indicator devices may comprise cylinders or other shapes configured to represent one or more quantities of casino chips. The one or more chip indicator devices may comprise one or more electro-mechanical motors coupled to the one or more chip indicators and configured to adjust a position (e.g., raise or lower) the one or more chip indicators. The one or more chip indicator devices may comprise one or more communication modules configured to send and receive data such as one or more commands configured to cause the one or more electro-mechanical motors to raise or lower the one or more chip indicators.

The one or more chip indicator devices may be integral to a player table, or may be mobile such that the one or more chip indicator devices may be carried from place to place (e.g., table to table) by the one or more players. The one or more chip indicators may comprise one or more shapes, one or more colors, one or more dimensions, or other features associated with one or more values. For example, each chip indicator device may comprise a plurality of chip indicators. For example, a first chip indicator may be configured to indicate values (e.g., dominations) of one credit, one dollar, or the like. For example, a second chip indicator of the plurality of chip indicators may be configured to indicate values (e.g., denominations) of five credits, five dollars, or the like. Similarly, a third chip indicator of the plurality of chip indicators may be configured to indicate ten dollar denominations, while a fourth chip indicator is configured to indicate one hundred dollar denominations. The aforementioned are merely exemplary and a person skilled in the art will appreciate that any denominations may be represented (e.g., indicated) by any number of chip indicators of a chip indicator device.

At 530, one or more commands may be received by the one or more chip indicator devices. The one or more commands may be configured to cause the one or more chip indicator devices to reconfigure the one or more chip indicators as one or more physical representations of one or more updated credit balances.

At 540, the one or more physical representations of the one or more credit balances (or portions thereof) may be caused to be output. For example, the one or more chip indicators associated with the one or more chip indicator devices may be caused to be moved. For example, the one or more chip indicators associated with the one or more chip indicator devices may be caused to be moved based on the one or more signals (e.g., the one or more increment amounts based on the one or more adjusted credit balances). For example, the one or more chip indicators may be raised or lowered to represent the updated one or more credit balances.

Figure 6:
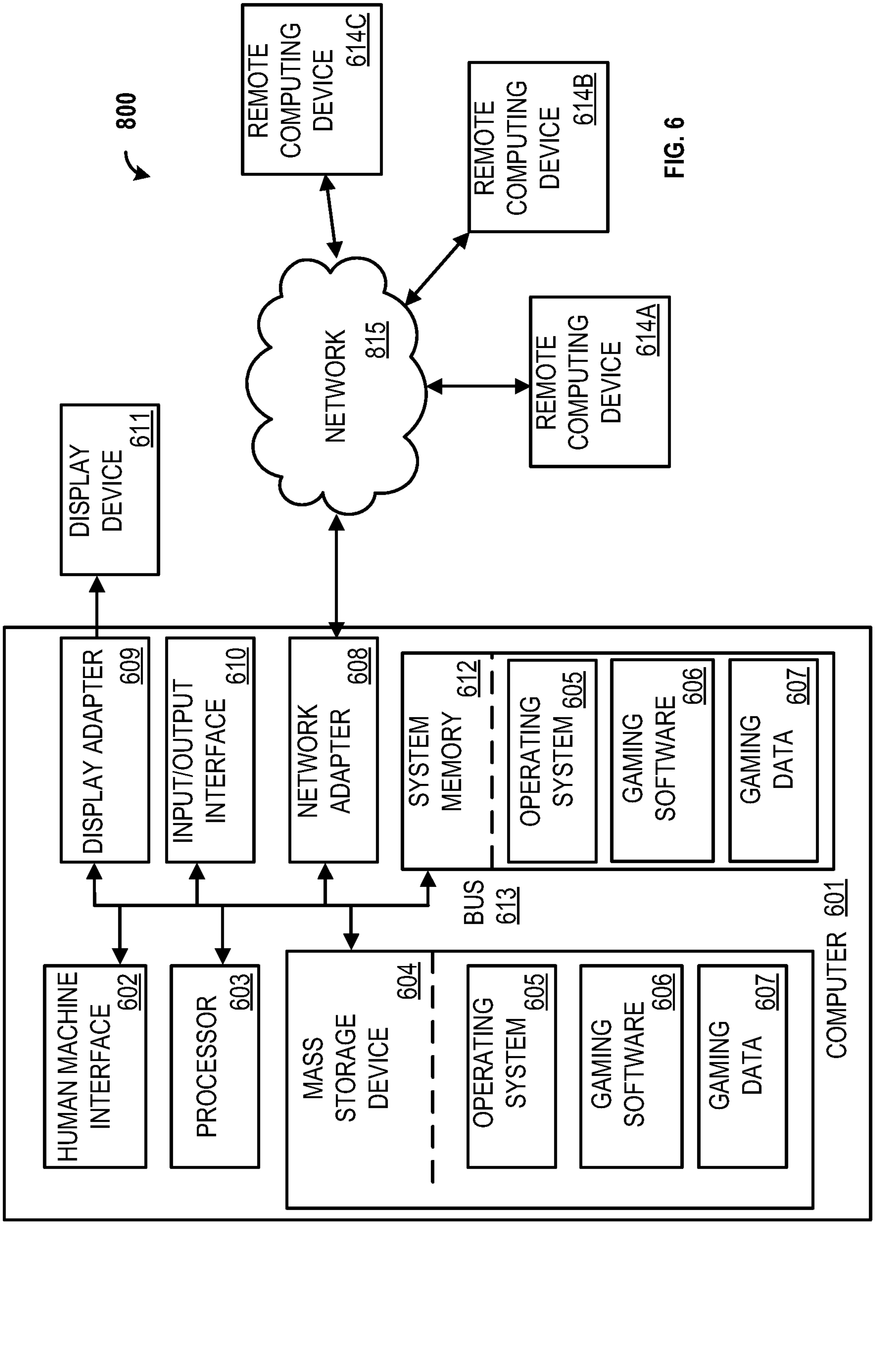
FIG. 6 shows an example system.

FIG. 6 shows an example system 600. Any one or more of the computing device 110, the player device 120, the dealer device 130, the indicator device 140, and/or the peripheral device may be the computer 601. The computer 601 may comprise one or more processors 603, a system memory 612, and a bus 613 that couples various system components including the one or more processors 603 to the system memory 612. In the case of multiple processors 603, the computer 601 may utilize parallel computing. The bus 613 is one or more of several possible types of bus structures, including a memory bus or memory controller, a peripheral bus, an accelerated graphics port, or local bus using any of a variety of bus architectures.

The computer 601 may operate on and/or comprise a variety of computer readable media (e.g., non-transitory). The readable media may be any available media that is accessible by the computer 601 and may comprise both volatile and non-volatile media, removable and non-removable media. The system memory 612 has computer readable media in the form of volatile memory, such as random access memory (RAM), and/or non-volatile memory, such as read only memory (ROM). The system memory 612 may store data such as the gaming data 607 and/or program modules such as the operating system 605 and the gaming software 606 that are accessible to and/or are operated on by the one or more processors 603. The machine learning module may comprise one or more of the gaming data 607 and/or the gaming software 606. The computer 601 may also comprise other removable/non-removable, volatile/non-volatile computer storage media. FIG. 6 shows the mass storage device 604 which may facilitate non-volatile storage of computer code, computer readable instructions, data structures, program modules, and other data for the computer 601. The mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any quantity of program modules may be stored on the mass storage device 604, such as the operating system 605 and the gaming software 606. Each of the operating system 605 and the gaming software 606 (or some combination thereof) may comprise elements of the program modules and the gaming software 606. The gaming data 607 may also be stored on the mass storage device 604. The gaming data 607 may be stored in any of one or more databases known in the art. Such databases may be DB2®, Microsoft® Access, Microsoft® SQL Server, Oracle®, MySQL, PostgreSQL, and the like. The databases may be centralized or distributed across locations within the network 615.

A user may enter commands and information into the computer 601 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 603 via a human machine interface 602 that is coupled to the bus 613, but may be connected by other interface and bus structures, such as a parallel port, game port, an IEEE 1394 Port (also known as a Firewire port), a serial port, network adapter 608, and/or a universal serial bus (USB).

The display device 611 may also be connected to the bus 613 via an interface, such as the display adapter 609. It is contemplated that the computer 601 may comprise more than one display adapter 609 and the computer 601 may comprise more than one display device 611. The display device 611 may be a monitor, an LCD (Liquid Crystal Display), light emitting diode (LED) display, television, smart lens, smart glass, and/or a projector. In addition to the display device 611, other output peripheral devices may be components such as speakers (not shown) and a printer (not shown) which may be connected to the computer 601 via the Input/Output Interface 610. Any step and/or result of the methods may be output (or caused to be output) in any form to an output device. Such output may be any form of visual representation, including, but not limited to, textual, graphical, animation, audio, tactile, and the like. The display device 611 and computer 601 may be part of one device, or separate devices.

The computer 601 may operate in a networked environment using logical connections to one or more remote computing devices 614A,B,C. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 601 and a remote computing device 614A,B,C may be made via a network 615, such as a local area network (LAN) and/or a general wide area network (WAN). Such network connections may be through the network adapter 608. The network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components reside at various times in different storage components of the computing device 601, and are executed by the one or more processors 603 of the computer. An implementation of the gaming software 606 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the quantity or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The various systems described with reference to FIGS. 1-6 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Some embodiments of the technology have been described above, and in addition, some specific details are shown for purposes of illustrating the inventive principles. However, numerous other arrangements may be devised in accordance with the inventive principles of this patent disclosure. Further, well known processes have not been described in detail in order not to obscure the technology. Thus, while the disclosure is described in conjunction with the specific embodiments illustrated in the drawings, it is not limited to these embodiments or drawings. Rather, the disclosure is intended to cover alternatives, modifications, and equivalents that come within the scope and spirit of the inventive principles set out in the appended claims.

The invention claimed is:

1. A method comprising:

determining, by a computing device, one or more credit balances associated with one or more player accounts;

causing one or more chip indicators to be configured as one or more physical representations of the one or more credit balances, wherein the one or more chip indicators are disposed in one or more chip indicator devices, and wherein the one or more chip indicator devices comprise one or more mobile chip indicator devices;

updating based on game play, the one or more credit balances; and causing, based on the updated one or more credit balances, the one or more chip indicators to be configured as one or more physical representations of one or more updated credit balances.

2. The method of claim 1, wherein the one or more chip indicators comprise one or more physical objects configured to represent a quantity of casino chips.

3. The method of claim 1, wherein the one or more chip indicators are disposed in one or more chip indicator devices, and wherein the one or more chip indicator devices are integral to one or more gaming tables.

4. The method of claim 1, wherein the one or more physical representations are configured to resemble one or more casino chips.

5. The method of claim 1, wherein determining the one or more credit balances associated with one or more players comprises one or more of: receiving one or more user inputs, receiving one or more player identifier cards, querying a database configured to store the one or more player accounts associated with the one or more players, or receiving one or more signals from one or more mobile devices associated with the one or more players.

6. The method of claim 1, wherein causing the one or more chip indicators to be configured as the one or more physical representations of the one or more credit balances comprises actuating one or more electro-mechanical motors coupled to the one or more chip indicators.

7. The method of claim 1, further comprising receiving one or more wagers.

8. A system comprising:

a gaming table comprising one or more player stations and a first computing device; and one or more chip indicator devices associated with each player station of the one or more player stations, wherein each chip indicator device of the one or more chip indicator devices comprises one or more motors configured to configure one or more chip indicators as one or more physical representations of a credit value, the one or more chip indicator devices configured to:

receive one or more credit balances associated with one or more players at the one or more player stations;

cause output, based on the one or more credit balances associated with the one or more players, via the one or more chip indicators, the one or more physical representations of the one or more credit balances, wherein the one or more chip indicators are disposed in one or more chip indicator devices, and wherein the one or more chip indicator devices comprise one or more mobile chip indicator devices;

receive, based on game play, one or more commands configured to cause the one or more chip indicator devices to reconfigure the one or more chip indicators; and cause output, based on the one or more commands, via the one or more chip indicators, one or more physical representations of one or more updated credit balances.

9. The system of claim 8, wherein the one or more chip indicators comprise one or more physical objects configured to represent a quantity of casino chips.

10. The system of claim 9, wherein the one or more chip indicator devices are integral to one or more gaming tables.

11. The system of claim 9, wherein the one or more physical representations are configured to resemble one or more casino chips.

12. The system of claim 8, wherein receiving the one or more credit balances associated with the one or more players comprises one or more of: receiving one or more user inputs, receiving one or more player identifier cards, querying a database configured to store one or more player accounts associated with the one or more players, or receiving one or more signals from one or more mobile devices associated with the one or more players.

13. The system of claim 8, wherein causing output of the one or more physical representations of the one or more credit balances comprises actuating one or more electro-mechanical motors coupled to the one or more chip indicators.

14. The system of claim 8, wherein the one or more chip indicators are further configured to receive one or more wagers.

15. A chip indicator apparatus comprising:

one or more processors; and memory storing processor executable instructions that, when executed by the one or more processors, cause the chip indicator apparatus to:

receive one or more credit balances associated with one or more players;

cause output, based on the one or more credit balances associated with the one or more players, via one or more chip indicators, one or more physical representations of the one or more credit balances, wherein the chip indicator apparatus comprises one or more mobile chip indicator devices;

receive one or more commands configured to cause the chip indicator apparatus to reconfigure the one or more chip indicators; and cause output, based on the one or more commands, via the one or more chip indicators, one or more physical representations of one or more updated credit balances.

16. The chip indicator apparatus of claim 15, wherein the one or more chip indicators comprise one or more physical objects configured to represent a quantity of casino chips.

17. The chip indicator apparatus of claim 16, wherein chip indicator apparatus is integral to one or more gaming tables.

18. The chip indicator apparatus of claim 16, wherein the one or more physical representations are configured to resemble one or more casino chips.

19. The chip indicator apparatus of claim 15, wherein the processor executable instructions that, when executed by the one or more processors, cause the chip indicator apparatus to determine the one or more credit balances associated with the one or more players further cause the chip indicator apparatus to one or more of: receive one or more user inputs, receive one or more player identifier cards, query a database configured to store one or more player accounts associated with the one or more players, or receive one or more signals from one or more mobile devices associated with the one or more players.

20. The chip indicator apparatus of claim 15, wherein the processor executable instructions that, when executed by the one or more processors, cause the chip indicator apparatus to cause the one or more chip indicators to be configured as the one or more physical representations of the one or more credit balances further cause the chip indicator apparatus to cause an actuation of one or more electro-mechanical motors coupled to the one or more chip indicators.

* * * * *